(12) United States Patent
Payne et al.

(10) Patent No.: US 7,295,630 B2
(45) Date of Patent: Nov. 13, 2007

(54) RECEIVER HAVING A VARIABLE THRESHOLD SLICER STAGE AND A METHOD OF UPDATING THE THRESHOLD LEVELS OF THE SLICER STAGE

(75) Inventors: Adrian W. Payne, Horley (GB); Paul A. Moore, Seaford (GB); Brian J. Minnis, Crawley (GB)

(73) Assignee: NXP B.V., Eindhoven (NL)

( * ) Notice: Subject to any disclaimer, the term of this patent is extended or adjusted under 35 U.S.C. 154(b) by 855 days.

(21) Appl. No.: 10/015,848

(22) Filed: Dec. 10, 2001

(65) Prior Publication Data

US 2002/0122504 A1 Sep. 5, 2002

(30) Foreign Application Priority Data

Jan. 4, 2001 (GB) .................. 0100202.1

(51) Int. Cl.
 *H03K 9/00* (2006.01)
 *H03D 1/04* (2006.01)
(52) U.S. Cl. .................. 375/316; 375/346; 375/348
(58) Field of Classification Search ................ 375/316, 375/346, 348, 350
See application file for complete search history.

(56) References Cited

U.S. PATENT DOCUMENTS 5,459,762 A * 10/1995 Wang et al. ................. 375/336
5,670,951 A 9/1997 Servilio ....................... 340/825
5,761,251 A * 6/1998 Wender ....................... 375/345
5,825,243 A 10/1998 Sato ............................ 329/311
6,046,643 A * 4/2000 Kranz ......................... 331/1 A
6,272,193 B1 * 8/2001 Eglit .......................... 375/355

FOREIGN PATENT DOCUMENTS

EP  0469647 A2  2/1992
EP  0702475 A1  3/1996
EP  0912020 A2  4/1999

OTHER PUBLICATIONS

Japanese Patent Publication S60-208145 English Translation; Document PTO 05-2678; 1985.*
Patent Abstracts of Japan, Sugiyama Fumio, "Data Decision Circuit," Publication No. 60208145, Oct. 19, 1985, Application No. 59062124, Mar. 31, 1984.

* cited by examiner

*Primary Examiner*—Chieh M. Fan
*Assistant Examiner*—Jason M. Perilla

(57) ABSTRACT

A receiver having a variable bit slicer for detecting bits in a demodulated signal, comprises a demodulator (14) for deriving a demodulated bit rate signal, means (36) for storing a plurality of threshold values, each of the threshold values being selectively adjustable, means (28, 38) for selecting the threshold value for comparison with the current bit signal ($S_n$) in response to a sequence of N bits (where N is at least 2) ($B_{n-1}$, $B_{n-2}$) received prior to the current bit ($B_n$) and means (38, 40) for using the current bit to update the selected threshold value.

Figure 1:
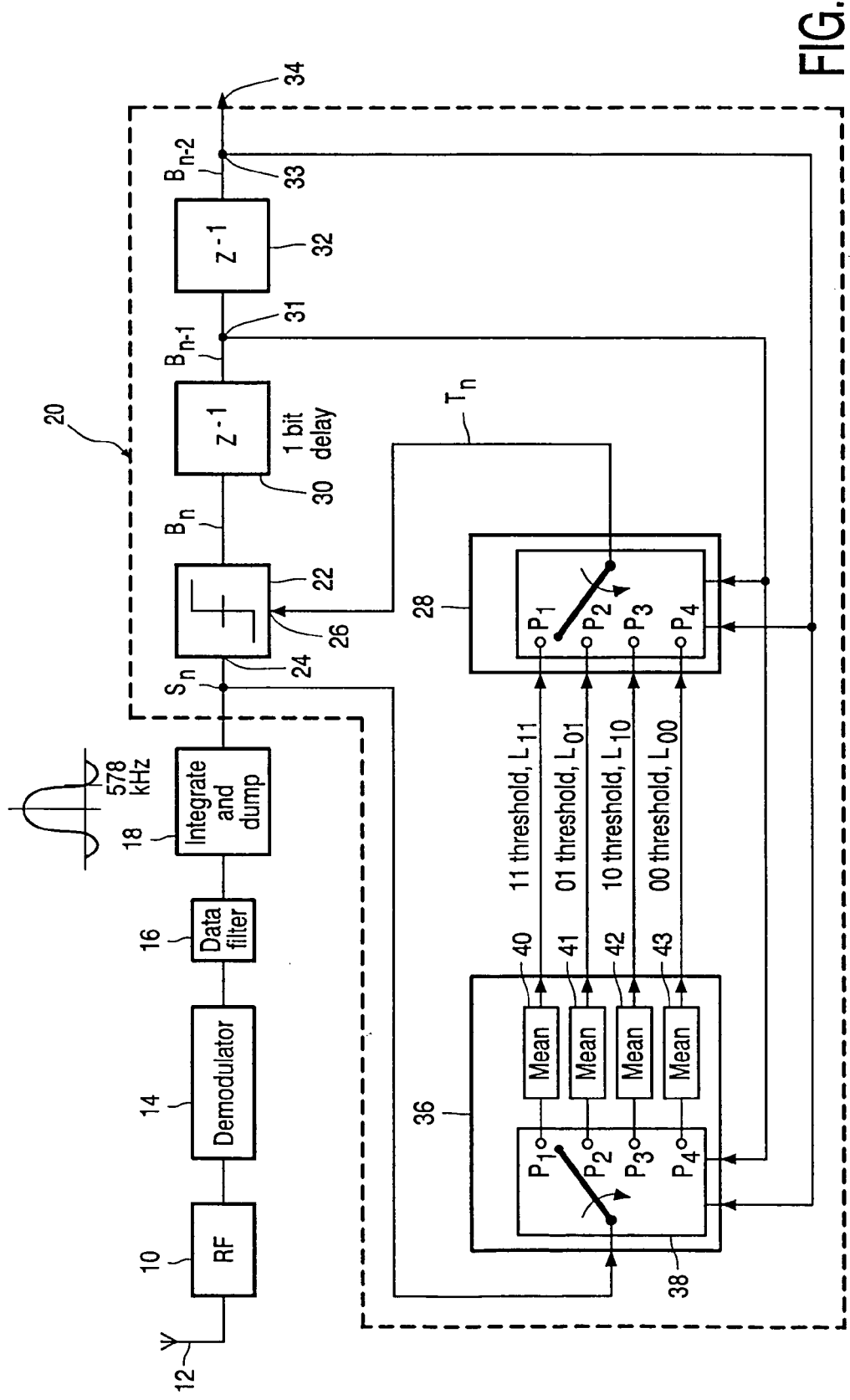

Also disclosed is a method of dc offset correction.

8 Claims, 6 Drawing Sheets

RECEIVER HAVING A VARIABLE THRESHOLD SLICER STAGE AND A METHOD OF UPDATING THE THRESHOLD LEVELS OF THE SLICER STAGE

The present invention relates to a receiver having a variable threshold slicer stage and to a method of updating the threshold levels of the slicer stage. The present invention has particular, but not exclusive, application to multilevel modulation FSK schemes such as GFSK used in DECT and Bluetooth transmissions.

U.S. Pat. No. 5,670,951 discloses a four level frequency modulation receiver having a symbol detector comprising an analogue-to-digital converter for converting signal voltages to digital values and peak and valley counters for tracking the digital values to determine the peak and valley values associated with high and low voltages of the signal. Calculation circuitry calculates upper, lower and centre thresholds based on the peak and valley values. A decoder generates data symbols in accordance with the upper, lower and centre thresholds.

U.S. Pat. No. 5,825,243 discloses a method of, and apparatus for, demodulating a multi-level signal in which an input multi-level amplitude modulated analogue signal is converted into a digital signal using an analogue-to-digital converter (ADC). A threshold generator calculates a plurality of threshold levels in accordance with the digital signals. A demodulator demodulates the digital signal in accordance with the plurality of threshold levels to a signal according to a level of the digital signal. More particularly the 8 maximum values and the 8 minimum values are stored and the average of each is determined and using the average maximum and minimum values, 3 threshold values are determined by arithmetic operations including differencing, dividing and subtracting.

These prior patent specifications disclose methods of adjusting the threshold levels of symbol detectors based on tracking the high and low (or peak and valley) values of a received signal and arithmetically manipulating these values to determine the high, low and intermediate threshold values. However there are situations in which determining the threshold values in this manner does not give optimum symbol detection. This may occur when demodulating GFSK (Gaussian Frequency Shift Key) modulated data whose peak deviation has been compromised by excessive filtering of a low modulation index. An eye diagram of the demodulated data is affected by ISI (intersymbol interference) causing the eye to close. A low modulation index also affects adversely the eye diagram. As the eye diagram reduces, the BER (bit error rate) at any given SNR (signal to noise ratio) will rise. A consequence of this is that errors may occur during symbol detection because the threshold values are not optimum.

An object of the present invention is to open the eye aperture of an eye diagram having regard to the modulation characteristics of the signal.

According to one aspect of the present invention there is provided a method of determining the value of a signal, in which N previously detected bits (where N is at least 2) of a demodulated bit stream are used to select which one of a plurality of threshold levels against which the current demodulated bit is to be compared in a bit slicer and is to be updated using the current demodulated bit.

According to another aspect of the present invention there is provided a receiver having a variable threshold slicer, comprising means for deriving a demodulated bit rate signal, means for storing a plurality of threshold values, each of the threshold values being selectively adjustable, means for selecting the threshold value for comparison with the current bit and for adjustment in response to a sequence of N bits (where N is at least 2) received prior to the current bit and means for using the current bit to update the selected threshold value.

By means of the method in accordance with the present invention each of the threshold levels used in the variable threshold slicer is independently adjustable. Also ISI is compensated for by being able to compare a demodulated signal with a plurality of thresholds.

According to a further aspect of the present invention there is provided a method of effecting dc offset compensation in a receiver having a variable threshold bit slicer, comprising selecting one of a plurality of preset default n bit values in accordance with a bit sequence formed by the latest and (n−1) earlier bit values as determined by the bit slicer, obtaining a demodulated signal integrated over at least 2 bit periods, subtracting the demodulated signal from the selected preset default value to produce a dc offset estimate, deriving a mean dc offset estimate from the current dc offset estimate and a plurality of preceding dc offset estimates, and using the mean dc offset estimate to remove the effects of dc offset in determining the value of a demodulated signal.

Figure 2:
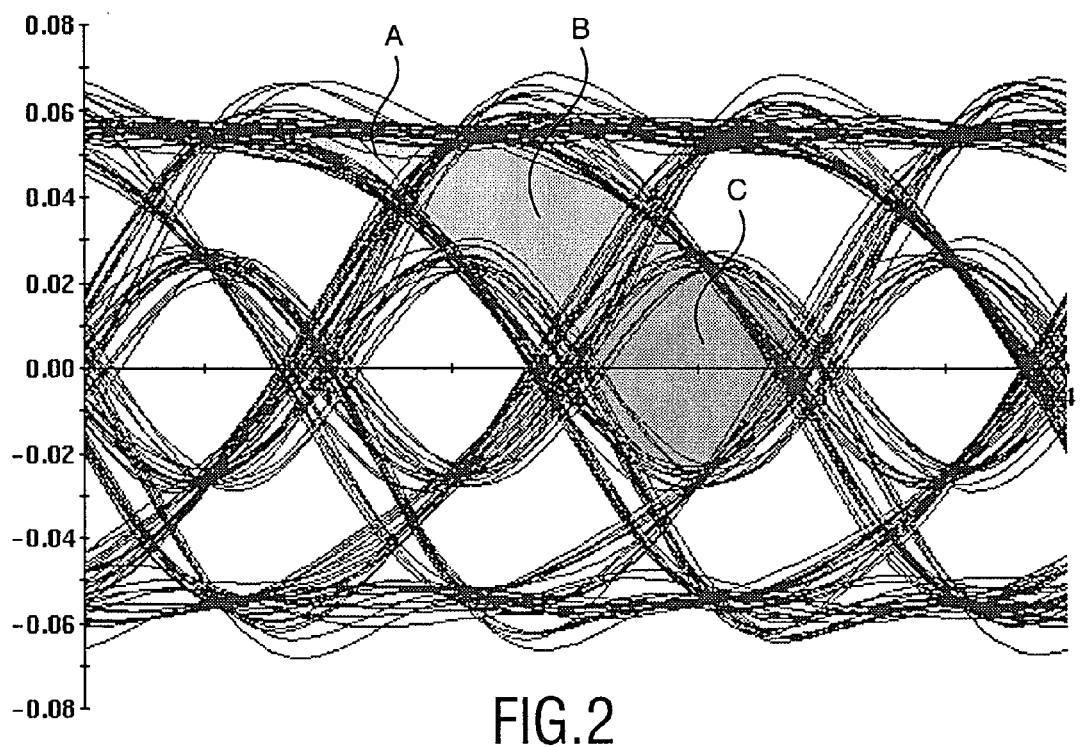
Figure 3:
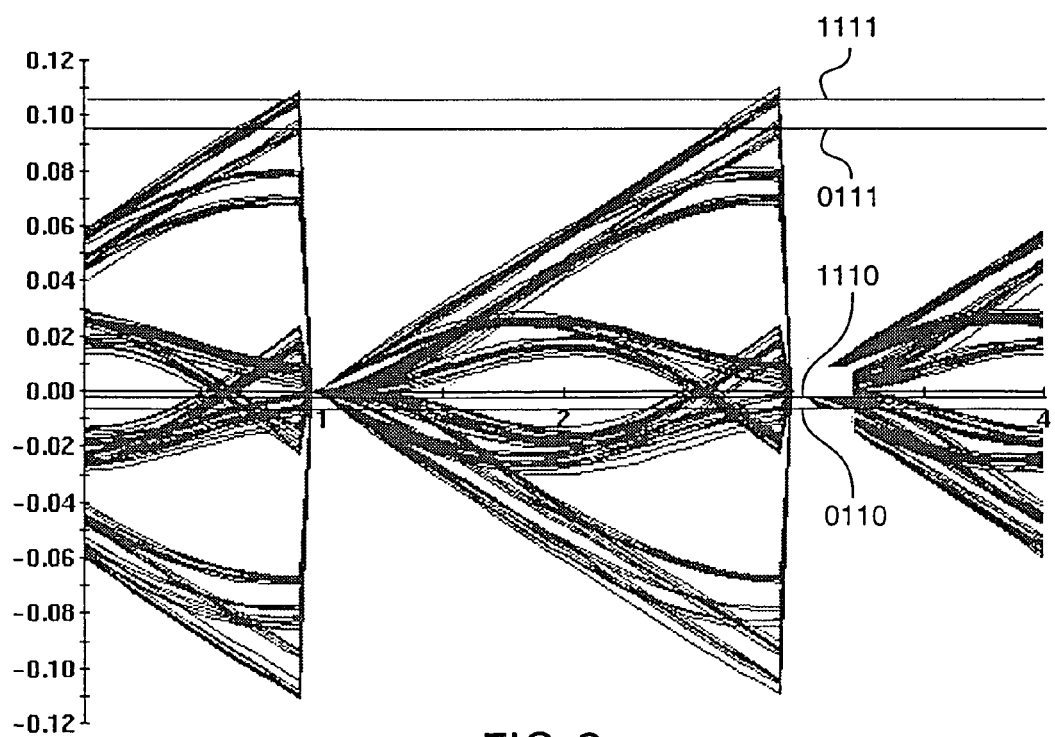
Figure 4:
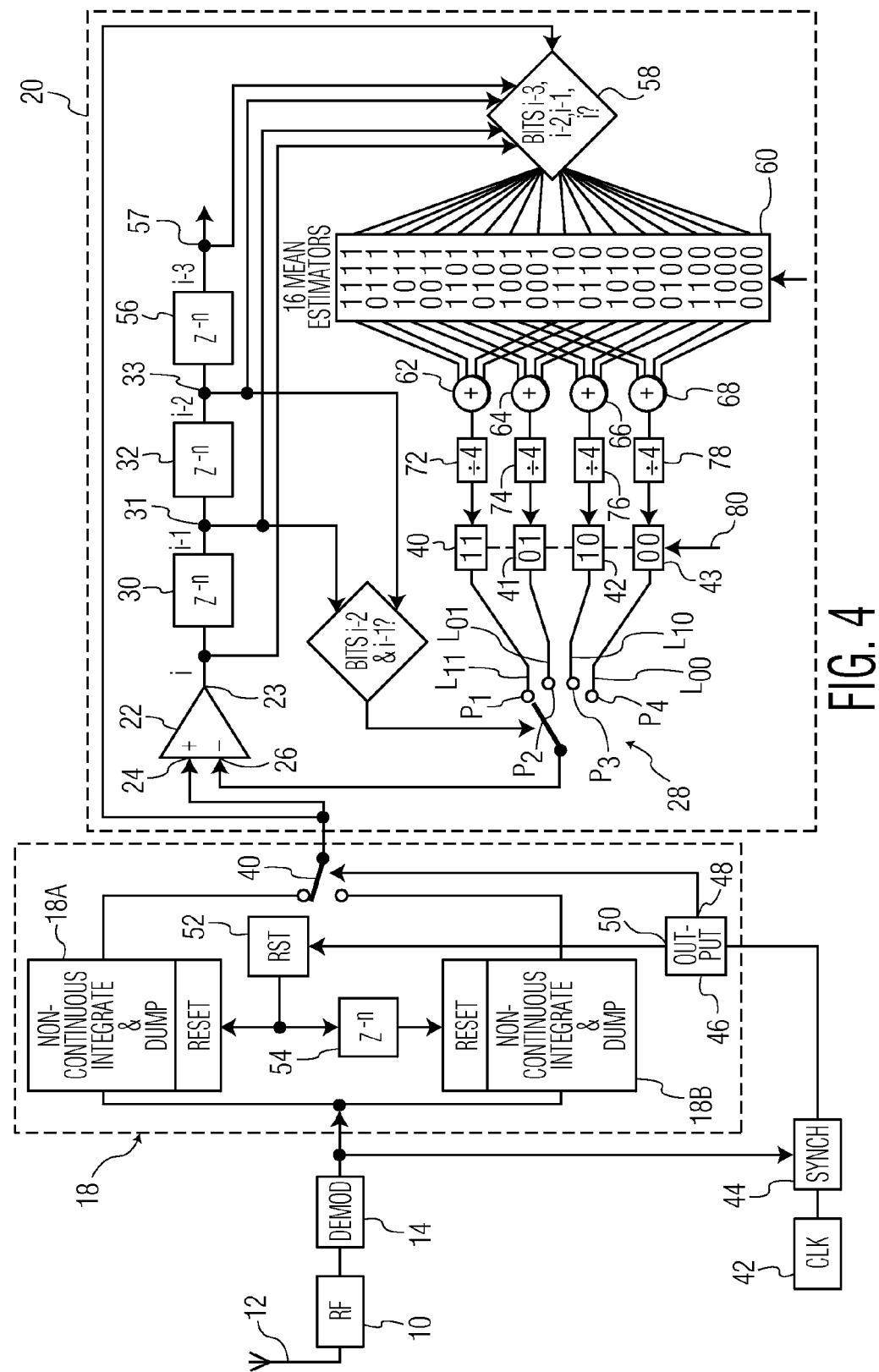
Figure 5:
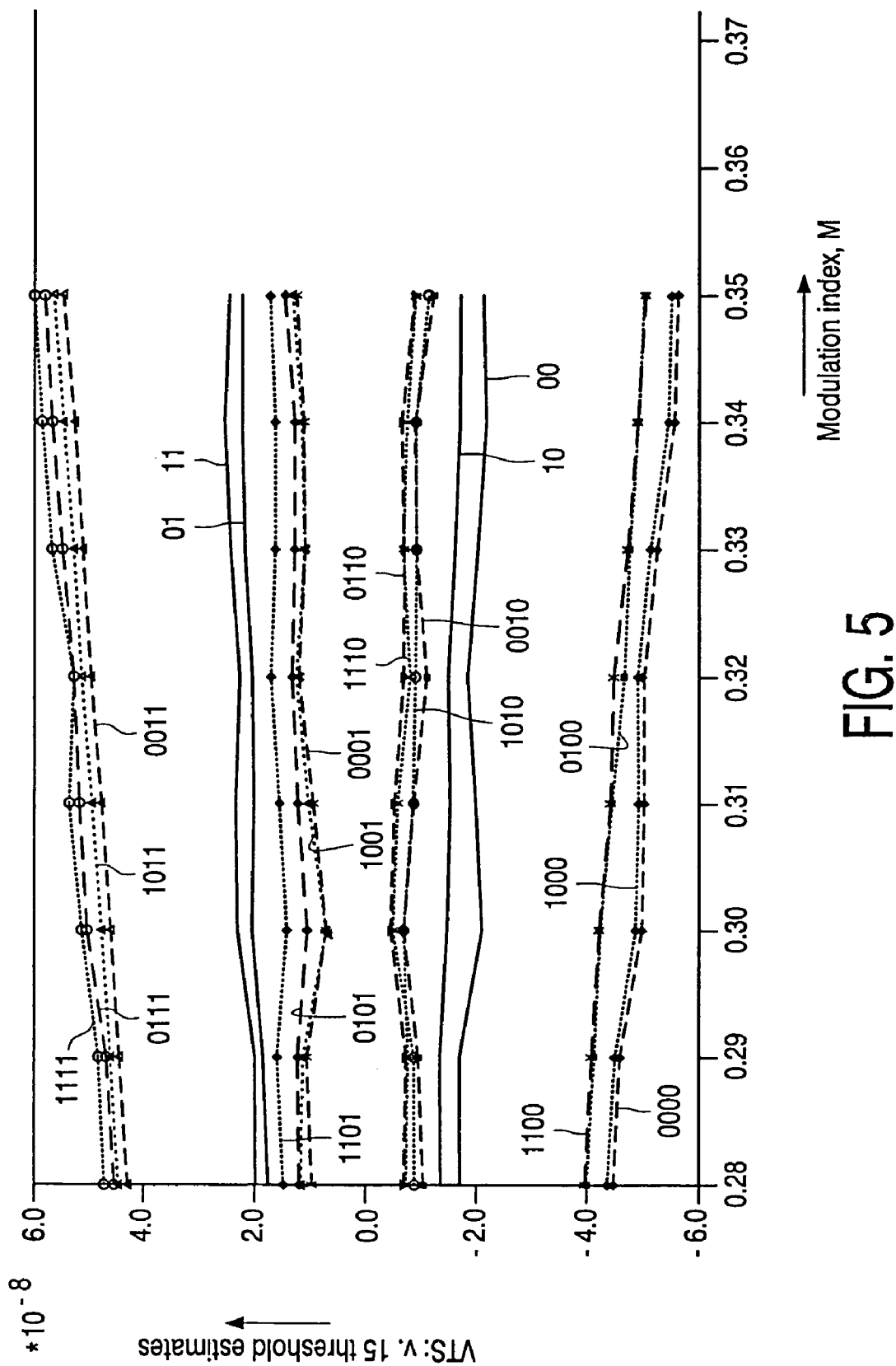

The present invention will now be described, by way of example, with reference to the accompanying drawings, wherein:

FIG. 1 is a simplified block schematic diagram of a GFSK receiver having a variable threshold slicer made in accordance with the present invention, FIG. 2 is a simulated eye diagram of a demodulated GMSK signal, FIG. 3 is a simulated output from an integrator of the variable threshold slicer made in accordance with the present invention, FIG. 4 is a block schematic diagram of a receiver having a variable threshold slicer in which each of 4 threshold levels is determined by the average of 4 mean estimators, FIG. 5 is a chart showing simulated variable threshold slicer thresholds as a function of modulation index, m.

Figure 6A:
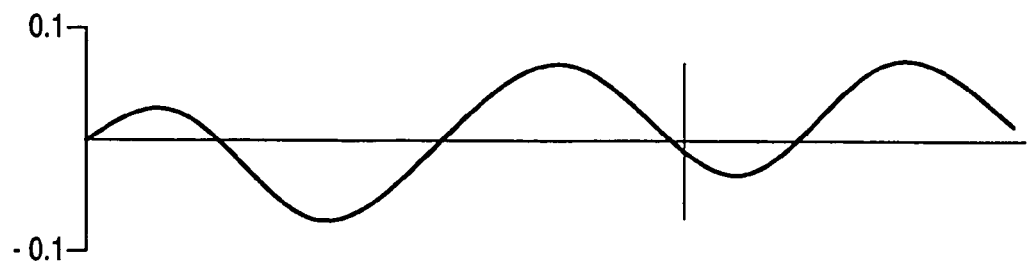
Figure 6B:
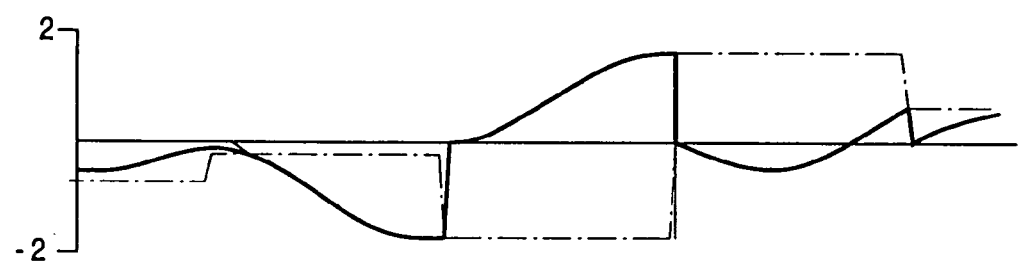
Figure 6C:
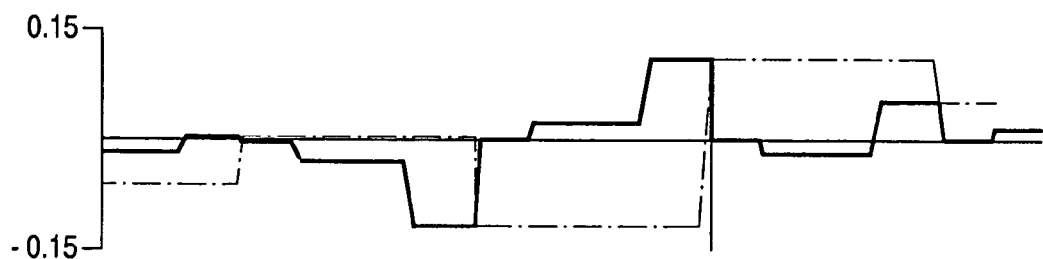
Figure 7:
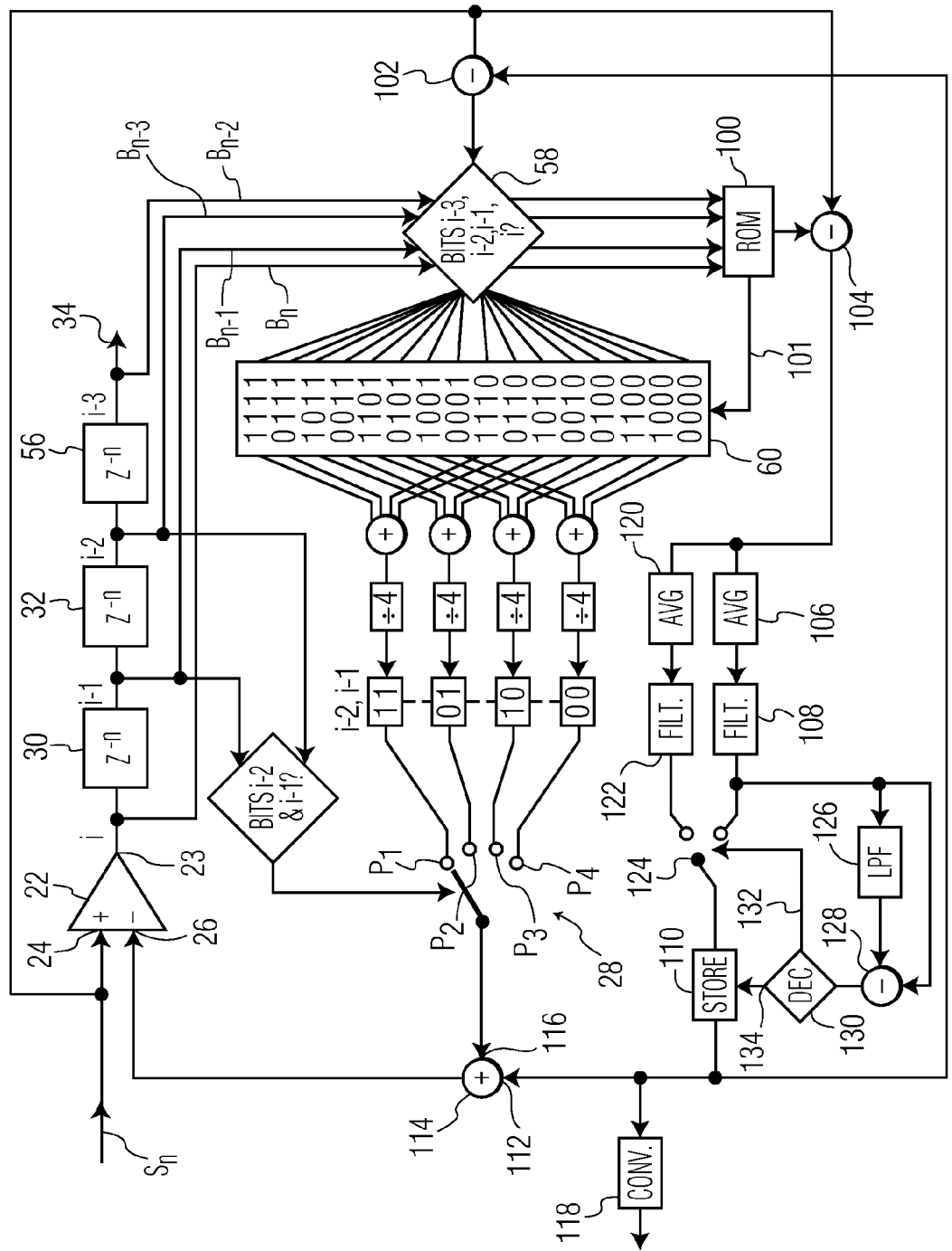

FIGS. 6A, 6B and 6C are graphs showing a demodulated signal input to a variable threshold slicer, a continuous integrator output and an intermittent integrator output, respectively, and FIG. 7 is a block schematic diagram of a receiving having a variable threshold slicer adapted to estimate rapidly the DC offset superimposed on the demodulated signal output.

In the drawings the same reference numerals have been used to indicate corresponding features.

The GFSK receiver shown in FIG. 1 comprises a rf front end 10 having an input coupled to an antenna 12 and an output coupled to a demodulator 14 which may be digital or analogue depending on the architecture of the receiver. A Gaussian data filter 16 having a bandwidth of 576 kHz for DECT (as shown) and 500 kHz for Bluetooth is coupled to an output of the demodulator 14. An integrate and dump stage 18 is coupled to an output of the data filter 16 and to an input of a variable threshold slicer 20 which has an output 34 for the detected bits.

The variable threshold slicer 20 comprises a slicer or comparator 22 having a first input 24 for a signal $S_n$ from the stage 18 and a second input 26 for one of four threshold levels as selected by a threshold level selector 28 implemented as a four position switch having positions $P_1$ to $P_4$. An output of the slicer 22 is coupled to two series connected one bit delay stages 30, 32, an output 33 of the latter being connected to the output terminal 34. The bit $B_n$ on the output of the slicer 22 represents the current bit, and the bits $B_{n-1}$ and $B_{n-2}$ on outputs 31, 33, respectively, are the two immediately preceding bits delayed by one bit and two bit intervals, respectively. The values of these two immediately preceding bits $B_{n-1}$, $B_{n-2}$ are used to select the particular threshold level $T_n$ to be applied to the input 26 of the slicer 22. The following truth table indicates how the binary values of $B_{n-1}$, $B_{n-2}$ determine the position of the level selector 28.

| $B_{n-2}$ | $B_{n-1}$ | Switch Position |
|---|---|---|
| 1 | 1 | $P_1$ |
| 0 | 1 | $P_2$ |
| 1 | 0 | $P_3$ |
| 0 | 0 | $P_4$ |

Thus the values of the two bits preceding the current bit $B_n$ determine the present threshold level.

The values of the threshold levels are provided by a threshold estimating stage 36. The stage 36 comprises a four position threshold selector switch 38 comprising, for convenience of reference, positions $P_1$ to $P_4$ which correspond to the threshold positions of the selector 28. The input signal to the switch 38 comprises the signal $S_n$ from the integrate and dump stage 18. Long time constant integrators 40 to 43 having a time constant of the order of, or greater than, one thousand bits to reduce the effects of noise are connected respectively between positions $P_1$-$P_1$, $P_2$-$P_2$, $P_3$-$P_3$, $P_4$-$P_4$ of the stages 36 and 28 to provide the four mean threshold levels $L_{11}$, $L_{01}$, $L_{10}$, $L_{00}$, respectively.

The position determined by the switch 38 is also selected by the values of the bits $B_{n-2}$, and $B_{n-1}$. Thus the threshold level being applied to the input 26 of the slicer 22 is also the level which is being updated by the signal $S_n$.

The variable threshold slicer 20 is intended to counter a feature of digital modulation techniques, such as GFSK, in which the output power spectrum is band limited to suppress radiation in adjacent channels. The consequent limitation of frequency deviation due to the use of a low modulation index and narrow bandwidth pre-modulation filtering can cause severe ISI, to which non-coherent demodulation techniques, such as discriminator detection, are particularly intolerant. In the cases of DECT and Bluetooth both have a BT (Bandwidth–bit period)=0.5 and Bluetooth at the lowest specified modulation index, m, of 0.28, will have the most severe ISI.

ISI causes the current bit $B_n$ to be affected by adjacent bits. For GMSK modulation with a BT of 0.5, the previous bit $B_{n-1}$ is dominant, $B_{n-2}$ has some effect and $B_{n-3}$ has very little effect. For each bit decision, a slicer threshold is chosen that is positive if the net effect of the ISI caused by the previous sequence of bits causes a positive bias and is negative if there is a negative bias. In FIG. 1, only the last two preceding bits $B_{n-1}$ and $B_{n-2}$ are needed to choose thresholds with sufficient resolution. The slicer 20 chooses a threshold according to whether the last two detected bits were 11, 01, 10 or 00. Thus each bit decision requires the selection of one of only four thresholds.

The output of the digital demodulator 14 is a time-discrete waveform with an amplitude representing the GFSK modulated data. In practice the demodulated signal is sampled at, say, 20 times the data rate, and each bit will be overspread to adjacent bits due to ISI. To analyse this information, an integration function is used that produces an estimate of the change in phase dominated by that caused by the latest bits. The integrate and dump stage 18 has a hold function, whereby the output of an integrator is held at the end of a period of two bits and is then reset. FIG. 2 shows the eye diagram of a demodulated GMSK signal and FIG. 3 shows the output of an integrator that integrates this signal and is reset every 2 bits (40 samples).

The eye patterns shown in FIG. 2 have been produced by an ideal noiseless simulation using a Bluetooth receiver model with m=0.35. It can be seen that the integrated waveform shown in FIG. 3 follows a limited number of paths depending on the mark-space sequence. To a first order, there are 16 curves defined by the current bit $B_n$ and, by ever decreasing amounts, the previous three bits $B_{n-1}$, $B_{n-2}$, $B_{n-3}$. The slight blurring of the 16 levels is the result of still earlier bits. The paths followed when the previous two bits $B_{n-1}$ and $B_{n-2}$ were both 1 are shown by the broken lines referenced 1111, 0111, 1110 and 0110. To perform a bit decision and deduce the current bit $B_n$, the integrated and held value is compared to a threshold chosen depending on the previous two detected bits. The optimum decision threshold for when bits $B_{n-1}$ and $B_{n-2}$ were both 1 is the middle (average) of the four integrated and held values that could occur for that particular bit sequence. This is because at this threshold, the signal path distance between mark and space is equal and there is no bias towards either mark or space. In practice, this technique equates to maximising the noise margin by an amount that is proportional to the cross hatched areas A, B, C in FIG. 2. The other three decision thresholds can similarly be deduced by averaging the four appropriate levels. Since a bit decision is required at every bit, in a practical embodiment two 2-bit integrate and hold filter functions are required, each being reset after alternate bits.

The variable threshold slicer 20 processes the signal with a long time constant filter (the integrator). This helps to collect the signal using a method which is better than the more conventional approach of simply sampling the signal at the data rate. The integrator also introduces a severe noise reduction mechanism. As the output of the integrator is dominated by the change in frequency caused by the latest two bits, the integrator has in effect exaggerated the intersymbol interference. Consequently, if the output of the integrate and hold is compared to a single near-zero threshold (as in a zero threshold slicer), there will be more bit errors. However, as the output of the integrate and hold is actually compared to multiple non-zero thresholds, in a manner that compensates for the ISI, overall there is a performance improvement.

FIG. 4 illustrates a more detailed version of a receiver having a variable threshold slicer 20 which determines the threshold values $L_{11}$, $L_{01}$, $L_{10}$ and $L_{00}$ using the current bit $B_n$ and the three preceding bits $B_{n-1}$, $B_{n-2}$ and $B_{n-3}$ to select the threshold value to be estimated.

Compared to FIG. 1, the integrate and dump stage 18 comprises two alternately reset integrate and dump stages 18A, 18B which are able to provide a signal every bit period, which signal is based on the digital signal values over the two preceding bit periods. A switch 40 is toggled every bit period to connect alternately the outputs of the stages 18A, 18B to the input 24 of the slicer 22.

A master clock 42 provides a clock signal having a frequency which is a multiple of the bit rate. Timing synchronisation of the clock signal with the output of the demodulator 14 is effected in a synchronising stage 44. The stage 44 is coupled to a toggle every bit stage 46 having a first output 48 coupled to the switch 40 and a second output 50 coupled to a reset every 2 bits stage 52. The stage 52 is coupled firstly to a reset input of the integrate and dump stage 18A and secondly to a one bit delay stage 54 whose output is coupled to a reset input of the integrate and dump stage 18B. The provision of the delay stage 54 enables the stages 18A and 18B to be alternately reset every bit period.

The variable threshold slicer 20 is in certain respects similar to that shown in FIG. 1. However in order to estimate a selected threshold value based on the mean of the most recent and the previous three bit values $B_n$, $B_{n-1}$, $B_{n-2}$ and $B_{n-3}$, three one bit delay stages 30, 32, 56 are connected in series to the output 23 of the slicer. The delay stages 30, 32, 56 have outputs 31, 33 and 57, respectively.

As in FIG. 1, the values of the two bits $B_{n-1}$, $B_{n-2}$ preceding the current bit are used to select the threshold value to be compared with the integrate and hold signal applied to the input 24 of the slicer 22.

After each bit decision, the latest integrate and hold signal is fed to one of sixteen mean estimators, collectively indicated by the reference numeral 60, and its mean value is updated. The relevant mean estimator is chosen by a decision stage 58 based on the value of the latest bit decision $B_n$ and the three preceding bit decisions $B_{n-1}$, $B_{n-2}$ and $B_{n-3}$. Over a period of time, the mean estimators 60 generate an average of the integrate and hold outputs of the sixteen 4-bit sequences. The time constant of these sixteen sliding mean estimators 60 is long, of the order of 1500 bits, which is chosen to give a stable value in the presence of noise and adapt only to any slow drift in carrier frequency.

The four slicer threshold values $L_{11}$, $L_{01}$, $L_{10}$ and $L_{00}$ are each the mean of the appropriate four of the sixteen averaged levels. In the embodiment of FIG. 4, the value of the bits $B_{n-1}$, $B_{n-2}$ in the respective ones of the sixteen 4-bit sequences determine which of the 4 bit values are averaged. By inspecting FIG. 4 it will be noted that a first summing stage 62 derives its four inputs from the *11* mean estimators, a second summing stage 64 makes use of the *01* mean estimators and similarly the third and fourth summing stages 66, 68 respectively make use of the *10* and *00* mean estimators. Divide-by-4 stages 72, 74, 76 and 78 respectively derive the averages of the first to fourth summing stages 62 to 68 and apply them to the long time constant integration stages 40 to 43. On start-up the integration stages 40 to 43 are preloaded with default threshold values applied to an input 80.

FIG. 5 shows a simulation of the sixteen averaged levels 1111 to 0000 and the four decision levels 11, 01, 10 and 00 calculated from the averaged levels. As an example threshold 11=(1111+1110+0110+0111)/4. This figure shows that the thresholds vary linearly with modulation index.

The timing synchronisation established by the stage 44 (FIG. 4) is important because it enables precise integration start and stop points to be chosen to coincide with the beginning and end of the eye pattern shown in FIG. 2 in order to minimise BER. In practice synchronisation is achieved using a conventional data slicer and a digital phase-locked loop technique operating on the first bits of the preamble.

In order to improve the co-channel interferer performance with the variable threshold slicer illustrated in FIGS. 1 and 4, the integrators need to be run intermittently, integrating the signal only in the middle of each of the two bits. For the other samples, the outputs of the integrators are held constant. In the case of an over-sampling ratio of 20, empirical tests have shown that the best co-channel rejection performance was achieved when the only samples integrated are the 10th, 30th and 31st samples of the 40 samples in a 2 bit period. Selecting two samples from what is the more recently received bit provides a bias in favour of that bit relative to the earlier bit.

In a variant of selecting samples, the samples are weighted between 0% and 100% so that different combinations of individually weighted samples can be used.

Referring to FIGS. 6A, 6B and 6C, it can be illustrated that apart from scaling differences, intermittent operation of the integrators produces broadly the same integrate and hold waveform (FIG. 6C) as occurs with a continuous integration (FIG. 6B). More particularly, FIG. 6A shows a demodulated signal input to the variable threshold slicer. In FIGS. 6B and 6C the solid waveforms are the outputs from the integrator and the chain-dot lines show the outputs from the integrator held at the end of each two-bit period. FIG. 6B relates to the continuous integration of all 40 samples of the 2 bit oversampled waveform and FIG. 6C relate to the intermittent integration of samples 10, 30 and 31.

There is a trade-off between the over-sampling ratio (OSR) and the performance of the variable threshold slicer. In the absence of a co-channel interferer, at OSR=20, the performance of the variable threshold slicer is not degraded by integrating only a selection of the samples, but at a lower OSR, it is. This degradation is believed to be due to the wanted and co-channel signals beating together and producing harmonics which can become aliased back to further interfere with the wanted signal. By way of example, increasing the OSR from 10 to 20 was found to improve co-channel rejection for Bluetooth by about 2 dB. The selection of samples for integration can be chosen for any value of OSR based on this pattern.

A varying and unwanted dc superimposed on the true demodulated signal adversely affects the performance of a variable threshold slicer. Such unwanted dc can be regarded as being equivalent to an error in the chosen slicer threshold. This can be a particular problem if there is a large carrier offset at the start of the packet of data being transmitted because the optimum threshold values may be different from the default values chosen at the start of any packet and can cause a higher BER until optimum values have been established, which higher BER may cause an entire packet to be missed.

FIG. 7 illustrates an embodiment of a receiver which is able to provide an accurate DC estimate after only 2 received bits. Any noise can be removed by minimal filtering thereby enabling the dc offset estimate to follow a rapidly drifting carrier.

In the interests of brevity, the portion of FIG. 7 which has been described with reference to FIG. 4 will not been described again.

The 4-bit sequence supplied to the 16 mean estimators 60 is also applied to a Read Only Memory (ROM) 100 which provides 16 default values on a line 101 to initialise the mean estimators at start-up. The demodulated signal integrated over a 2-bit period is supplied to subtracting stages 102, 104. The default value for the particular sequence identified by the 4-bit value supplied by the ROM is subtracted from the latest integrated and held value in the subtracting stage 104. The output from the subtracting stage comprises a value which comprises the dc offset plus noise. Thus the single integrate and hold value has been used to provide a dc offset estimation which is totally independent of the bit sequence and is only affected by noise. The first dc offset value is available only 2 bits after the first received data bit and only modest filtering is required to remove the effects of noise. Since after each bit decision, a new 4-bit sequence is generated, then the latest integrate and hold value is subtracted from the appropriate default value from the ROM 100 in the subtracting stage 104 to generate the latest estimate of do offset. The bit-rate stream of dc offset estimates is applied to an averaging stage 106 which obtains the mean dc estimate over the last 25 bits. The mean dc estimate is filtered in a single pole 50 kHz bandwidth low pass filter 108 to provide a dc offset estimate with the noise removed. The dc offset is held in a store 110 and is supplied to one input 112 of a summing stage 114. A second input 116 of the summing stage 114 is coupled to the threshold level selector 28. The dc offset is combined with the selected threshold value and the result is applied to the threshold input 26 of the slicer 22.

The dc offset estimate from the store 110 is also applied to the subtracting stage 102 where it is subtracted from the integrate and hold values being fed to the 16 mean estimators 60. The practical effect of doing this subtraction is that the four threshold values selected are estimated using integrate and hold values which are unaffected by the varying dc offset and consequently settle at stable values. The four threshold values will be independent of dc offset and be equally spaced around zero.

For the sake of completeness the dc offset estimate held in the store 110 can be used alternatively to control an AFC loop. In order to do this a conversion stage 118 is provided for converting the dc offset estimate to a frequency offset estimate which can be used to tune a frequency synthesiser (not shown).

The dc offset estimate may be used for dc offset cancellation and AFC subject to the dc offset estimation being more rapid than the delay through the receiver and the AFC loop thereby avoiding introducing some form of oscillation.

In a non-illustrated variant, the dc offset estimate from the store 110 is subtracted from the integrate and held signal $S_n$ and the result applied to the input 24 of the bit slicer 22 to be compared with a selected threshold value applied directly to the input 26 of the bit slicer 22. As a consequence the summing stage 114 is not required. If the demodulated signal $S_n$ with the dc offset estimate subtracted is available for updating the mean estimators 60 then the subtracting stage 102 is not required.

In a refinement of the dc offset estimation circuitry shown in FIG. 7 an estimate of the rate of drift is used to vary the responsiveness of a variable length sliding mean function from 200 to 25 bits. The output from the subtracting stage 104 is supplied to another average stage 120 which obtains the mean dc estimate over 200 bits. This mean dc estimate is filtered in a single pole, 50 kHz bandwidth low pass filter 122.

The outputs of the filter 108, 122 are applied to respective poles of a change-over switch 124 whose output is coupled to the store 110.

The estimate of drift rate is found by passing the averaged dc offset estimate from the filter 108 into a sluggish 1 kHz bandwidth low pass filter 126 and calculating a drift rate estimate by subtracting the filter output from the dc offset estimate in a subtracting stage 128. An indication of rapid, low or zero drift is provided by a stage 130 coupled to the subtracting stage 128. An output 132 from the stage 130 supplies a low/rapid drift signal to the change-over switch 124. Also an output 134 provides a drift/non-drift signal to the store 110.

In operation when the drift rate is very low or constant and the drift rate is below some chosen noise threshold, the dc offset estimate added to the four thresholds is held constant. This ensures that a noiseless signal is added to the thresholds. However if the drift is deemed to be rapid, the dc offset estimate is determined by averaging over 25 bits using the averaging stage 25. Alternatively if the drift is deemed to be slow, the dc offset estimate is determined by averaging over 200 bits using the averaging stage 120. The decision made by the stage 130 which controls the operation of the change-over switch 124.

The arrangement shown in FIG. 7 ensures that the dc offset estimate is responsive to rapid drift but accurate and noiseless when the drift is low.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of receivers having variable threshold slicers and component parts therefor and which may be used instead of or in addition to features already described herein.

The invention claimed is:

1. A method, comprising:
    determining a bit value of a demodulated signal, in which N previously detected bits (where N is at least 2) of a demodulated bit stream are used to select which one of a plurality of threshold levels against which a current demodulated bit is to be compared in a bit slicer and is to be updated using the current demodulated bit;
    subtracting the demodulated signal from one of a plurality of selected preset default values to produce a current dc offset estimate, deriving a mean dc offset estimate from the current dc offset estimate and a plurality of preceding dc offset estimates, combining the mean dc offset estimate with the selected threshold value and applying the combined signal to a threshold input of the bit slicer;
    adjusting a responsiveness of the mean dc offset estimate with respect to drift;
    oversampling the demodulated by a factor M, where M is an interger on the order of 20;
    intermittently integrating a least one sample in the vicinity of the M/2 sample of each of at least 2 bit periods of the demodulated signal to generate a demodulated signal to be compared with the selected one of the threshold values;
    comparing a result of the integrating with the selected threshold level; and
    using the result to update the selected threshold value.

2. A method as claimed in claim 1 further comprising: providing P (where P is at least 2) mean estimators associated with each of the threshold levels, and for a selected one of the plurality of threshold levels obtaining an average value of the associated P mean estimators and using the result as the selected one of the threshold values.

3. A method as claimed in claim 1, further comprising: after oversampling the demodulated bit stream, weighting samples of the demodulated bit stream.

4. A method as claimed in claim 1, further comprising: subtracting the dc offset estimate from the demodulated signal prior to updating the selected threshold value.

5. A method of effecting dc offset compensation in a receiver having a variable threshold bit slicer, comprising selecting one of a plurality of preset default threshold values in accordance with a bit sequence formed by a current (n) and (n-1) earlier bit values as determined by the variable threshold bit slicer, obtaining a demodulated signal integrated over at least 2 bit periods, subtracting the demodulated signal from the selected preset default threshold value to produce a current do offset estimate, deriving a mean dc offset estimate from the current dc offset estimate and a plurality of preceding dc offset estimates, using the mean dc offset estimate to remove an effect of dc offset in determining the value of the demodulated signal; and adjusting a responsiveness of the mean dc offset estimate with respect to drift.

6. A method as claimed in claim 5, wherein the mean dc offset estimate is combined with the selected threshold value and in that the combined signal is applied to a threshold input of the bit slicer.

7. A receiver having a variable threshold slicer, comprising means for deriving a demodulated bit stream, means for storing a plurality of threshold values, each of the plurality of threshold values being selectively adjustable, means for selecting one of the plurality of threshold values for determining a current bit and for adjustment of the selected threshold value in response to a sequence of N bits (where N is at least 2) including bits received prior to the currentbit and means for using the current bit to update the selected threshold value; and means for subtracting the a demodulated signal from a selected preset default value to produce a dc offset estimate, means for deriving a mean dc offset estimate from a current dc offset estimate and a plurality of preceding dc offset estimates, and means for combining the mean dc offset estimate with the selected one of the plurality of threshold values and for applying the combined signal to a threshold input of the variable threshold bit slicer;

means for adjusting the responsiveness of the mean dc offset estimate with respect to drift; and means for oversampling the demodulated signal by a factor M, where M is an integer on the order of 20, and means for intermittently integrating at least one sample in the vicinity of the M/2 sample of each of at least 2 bit periods of the demodulated signal to generate a signal to be compared with the selected one of the plurality of threshold values.

8. A receiver as claimed in claim 7, further comprising: means for weighting the samples obtained by oversampling.

* * * * *